United States Patent
An

(10) Patent No.: US 12,331,919 B2
(45) Date of Patent: Jun. 17, 2025

(54) LED LIGHTING DEVICE AND METHOD FOR ASSEMBLING LED LIGHTING DEVICE

(71) Applicant: Bitro Group, Inc., Hackensack, NJ (US)

(72) Inventor: Ketak An, Paramus, NJ (US)

(73) Assignee: Bitro Group, Inc., Hackensack, NJ (US)

( * ) Notice: Subject to any disclaimer, the term of this patent is extended or adjusted under 35 U.S.C. 154(b) by 167 days.

(21) Appl. No.: 18/131,080

(22) Filed: Apr. 5, 2023

(65) Prior Publication Data
US 2023/0341106 A1    Oct. 26, 2023

Related U.S. Application Data

(60) Provisional application No. 63/334,857, filed on Apr. 26, 2022.

(51) Int. Cl.
| | |
|---|---|
| *F21V 3/06* | (2018.01) |
| *B29C 45/14* | (2006.01) |
| *B29K 75/00* | (2006.01) |
| *B29L 31/00* | (2006.01) |
| *F21Y 115/10* | (2016.01) |

(52) U.S. Cl.
CPC ............ *F21V 3/0625* (2018.02); *B29C 45/14* (2013.01); *B29K 2075/00* (2013.01); *B29L 2031/747* (2013.01); *F21Y 2115/10* (2016.08)

(58) Field of Classification Search
CPC .............................. B29C 45/14; F21V 3/0625
See application file for complete search history.

(56) References Cited

U.S. PATENT DOCUMENTS

| | | | | |
|---|---|---|---|---|
| 2013/0050979 | A1* | 2/2013 | Van De Ven | F21V 3/04 362/84 |
| 2014/0198480 | A1* | 7/2014 | Dai | F21V 13/08 362/355 |
| 2019/0306926 | A1* | 10/2019 | Deering | F21V 29/90 |
| 2021/0231289 | A1* | 7/2021 | Pruitt | F21V 3/02 |
| 2022/0252778 | A1* | 8/2022 | Taniguchi | G09F 13/04 |

* cited by examiner

*Primary Examiner* — Abdulmajeed Aziz
*Assistant Examiner* — Nathaniel J Lee
(74) *Attorney, Agent, or Firm* — Myers Wolin, LLC

(57) ABSTRACT

A method is provided for assembling an LED lighting device. The method includes providing a polyurethane compound and mixing a diffuser compound with the polyurethane compound to form a combined compound. The method then includes injecting the combined compound into a cartridge, applying a vacuum to the cartridge, and sealing the cartridge at a first pressure lower than ambient pressure. The method then includes providing an LED lighting assembly having a front panel and a frame, the frame extending past the front panel to form an enclosed tray in a shape of the front panel. The combined compound is then dispensed from the cartridge into the enclosed tray.

13 Claims, 5 Drawing Sheets

LED LIGHTING DEVICE AND METHOD FOR ASSEMBLING LED LIGHTING DEVICE

CROSS-REFERENCE TO RELATED APPLICATION

This application takes priority from U.S. Provisional Patent Application No. 63/334,857 filed Apr. 26, 2022, the contents of which are incorporated by reference herein in their entirety.

FIELD OF THE INVENTION

The invention relates to LED lighting devices, specifically front panel configurations for LED lighting devices for use in shaped LED displays, such as channel letters and other signage, for controlling lighting output.

BACKGROUND

Light Emitting Diode (LED) lighting devices, such as those used in signage, often include shaped housing configurations to provide desirable aesthetics for lighting. For example, LED signage may be provided in the shape of letters or a corporate logo. In the case of letters, such signage components are often referred to as channel letters, which provide internal channels for incorporating LED lighting.

Channel letters can be lit in a wide variety of ways. However, in many potential configurations, a translucent front panel is provided that modifies one or more qualities of the light output by the LED lighting device. Such a translucent front panel may then control light diffusion, determining how evenly lit the front panel is, as well as a color and amount of light output by the signage.

A front panel that does not properly diffuse light from within the channel letter housing may lead to visible hot spots in the front face of the sign.

Front panels are often formed from acrylic panels with either embedded diffusion and color characteristics or with surface layers applied to control such diffusion and color. However, such front panels must be cut to size and shape, which is time consuming. Further, such cutting must be done with tight tolerances, or visible gaps will appear in the finished product.

In some cases, multiple front panels are layered and each serve different purposes in the context of the LED lighting device. Accordingly, a first front panel may be provided in the device to stabilize a shape of a frame while a second discrete panel may be provided to address aesthetic considerations, including diffusion and color. In some such cases, a polyurethane compound, or resin, is provided in liquid form as a second layer applied to a front panel of the LED lighting device and is then cured in place to function as the second discrete panel.

In existing LED lighting devices using liquid polyurethane compounds or resins, such compounds are typically mixed in a container and then poured into place. Such an approach results in a resin that cannot be stored, since it is mixed in a container, and which introduces air into the compound when poured. Pouring the resin in this way results in poor surface quality which often leads to bubbles in the finish of the LED lighting device.

While these challenges are described in the context of channel letters, such challenges also exist in other shaped lighting houses, including in the context of lighting in the shape of corporate logos or in geometric shapes.

SUMMARY

A method is provided for assembling an LED lighting device. The method includes providing a polyurethane compound and mixing a diffuser compound with the polyurethane compound to form a combined compound. The method then includes injecting the combined compound into a cartridge, applying a vacuum to the cartridge, and sealing the cartridge at a first pressure lower than ambient pressure.

The method then includes providing an LED lighting assembly having a front panel and a frame, the frame extending past the front panel to form an enclosed tray in a shape of the front panel. The combined compound is then dispensed from the cartridge into the enclosed tray.

In some embodiments, the diffusor compound modifies a translucency of the combined compound. In some embodiments, the diffusor compound modifies a color of the combined compound. In some embodiments, the diffusor compound modifies a fire-retarding property or surface texture of the combined compound once dispensed into the enclosed tray and cured. In some embodiments, the diffusor compound modifies a viscosity of the compound during dispensing into the enclosed tray.

In some embodiments, the shape of the front panel is a shape of a letter.

In some embodiments, the first pressure is a vacuum.

In some embodiments, the front panel of the LED lighting assembly is transparent. In some such embodiments, the front panel is formed from polycarbonate. In some such embodiments, the frame is formed from a flexible metal, and prior to providing the LED lighting assembly, the frame is secured in the shape of the front panel by fixing the front panel to an interior surface of the frame.

In some embodiments, the frame has a substantially consistent cross-sectional profile matching the shape. The front panel may then be fixed to the frame adjacent a front of the frame, such that a front of the front panel combines with an interior surface of the frame to define the enclosed tray.

In some such embodiments, the frame houses at least one LED lighting module behind the front panel and directed towards the front panel.

In some embodiments, the polyurethane compound and the combined compound are in liquid form until dispensed from the cartridge. The combined compound then cures to a solid in the enclosed tray. In some such embodiments, curing the combined compound is by applying heat after dispensing into the enclosed tray.

DETAILED DESCRIPTION OF THE PREFERRED EMBODIMENTS

Figure 1:
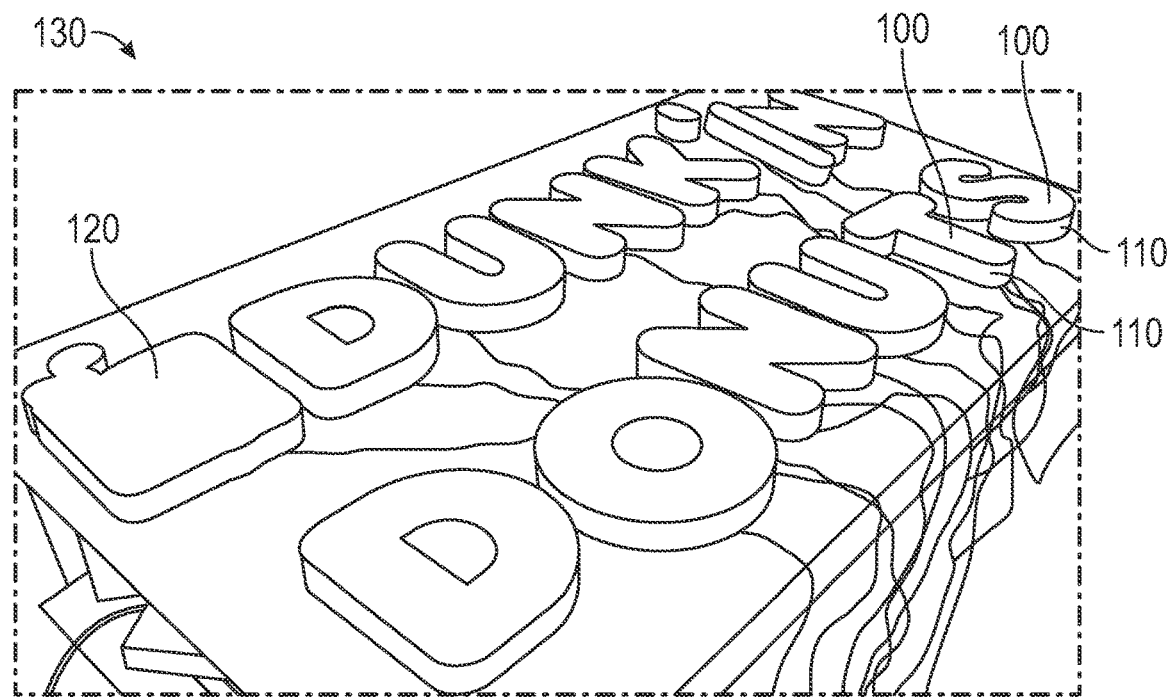
FIG. 1 is a first example of LED lighting devices in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 is a first example of LED lighting devices 100 in accordance with this disclosure.

As shown, the LED lighting devices 100 each have a frame 110 that forms a shape. When viewed from a front surface, the frame 110 of each such lighting device 100 is often provided in the shape of a letter, such that the frame is an extrusion forming an outline of the desired letter. Similarly, a frame may form a shape of a logo design, or a portion of a corporate logo design 120. The lighting devices 100 then combine to form a complete sign which may spell out words or illustrate a logo design.

As shown, each LED lighting device 100 may be one of several such devices in a set 130, with each device taking the shape of a different letter or associated shape.

The frame 110 may be formed from a variety of metals, including aluminum. As such, the frame 110 may be formed from a relatively flexible material and may be provided initially as a rolled sheet of material or as several rolled sheets of material.

Figure 2:
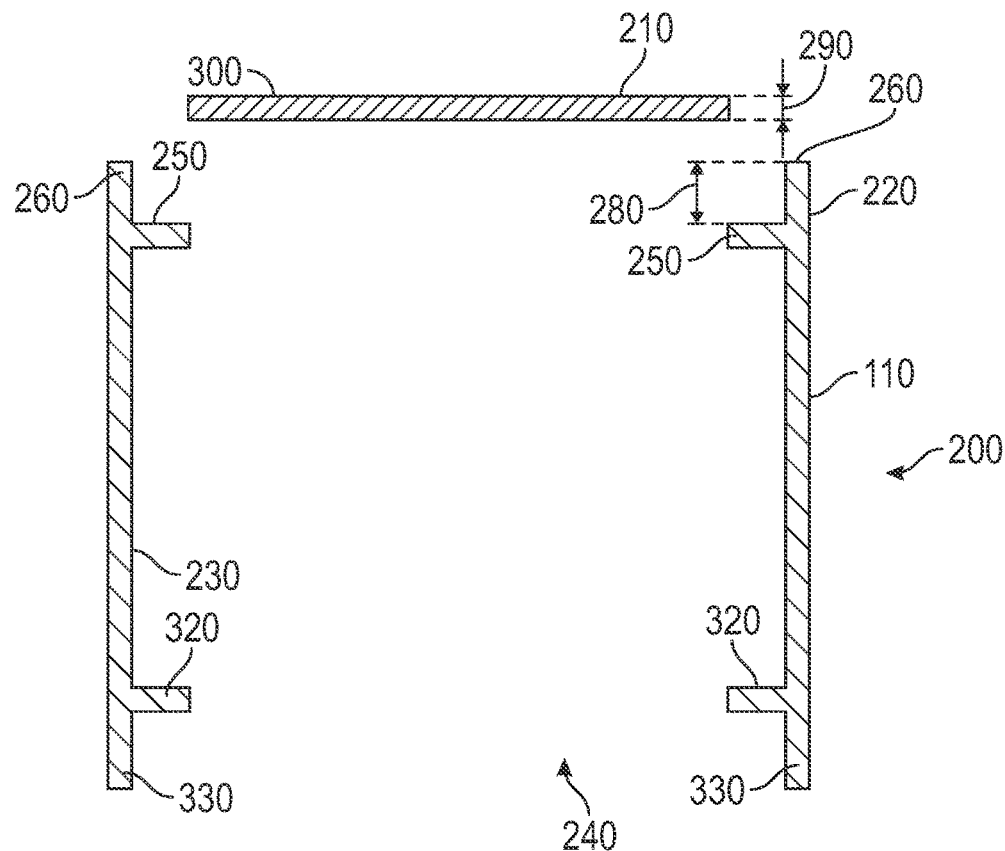
FIGS. 2-4 illustrate the preparation of one embodiment of an LED lighting assembly for us in the method of this disclosure.
Figure 3:
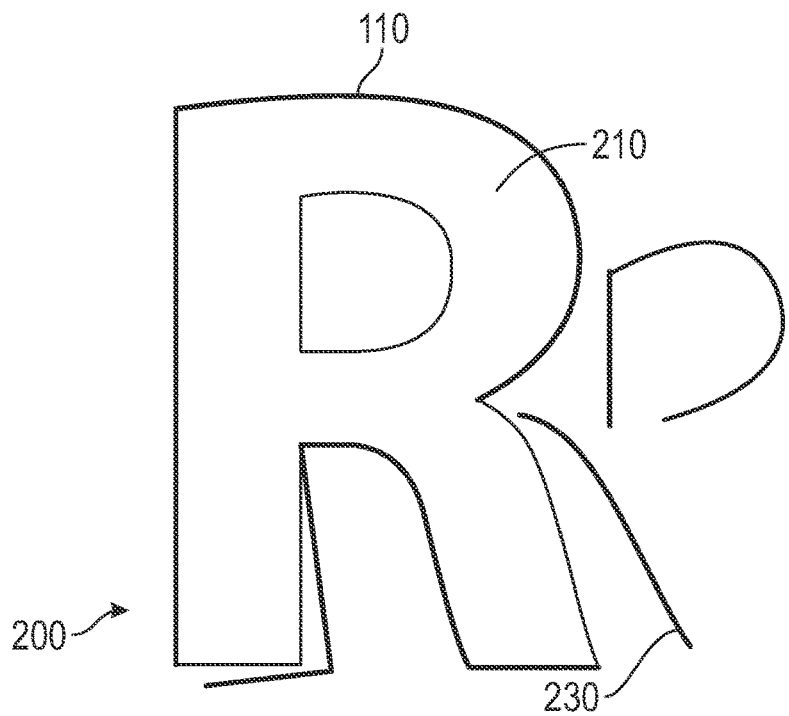
Figure 4:
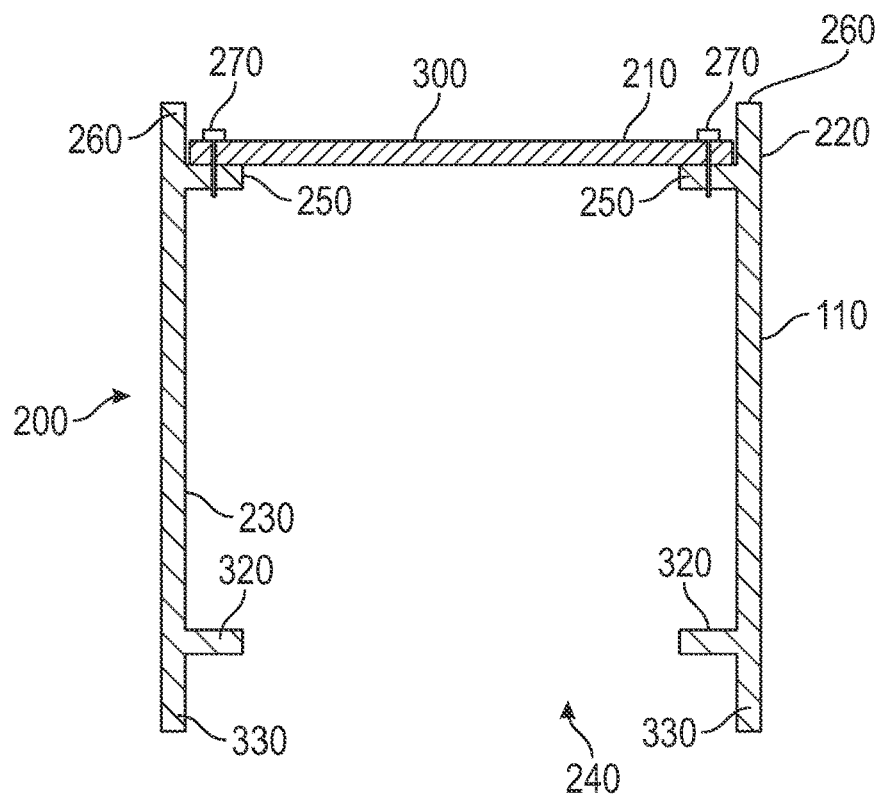

FIGS. 2-4 illustrate the preparation of one embodiment of an LED lighting assembly 200 for use in the method of this disclosure. Such a lighting assembly 200 typically has a front panel 210 and a frame 110. Once assembled, the frame 110 extends past a front of the front panel 210, thereby forming a front lip 220.

The frame 110 may be provided with a consistent cross section, as shown in FIGS. 2-4, taking the form of the shape desired. As such, the frame 110 may be an extrusion of material, or it may be a sheet of material formed into the designed shape. Alternatively, in some embodiments, the cross section of the frame 110 may be enlarged or shrunk over its thickness, such that the cross section consistently takes the desired shape, but in different sizes such that the overall device is tapered. In the embodiments shown, the frame 110 takes the form of an extrusion in the shape of the letter being formed, such as the R shown being assembled in FIG. 3.

The frame 110 is provided with an inner surface 230 that surrounds a lighting chamber 240 inside the LED lighting device 100. The frame 110 may be further provided with a front protrusion 250 which extends from the inner surface 230 of the frame 110. It will be understood that the front protrusion 250 is not part of the cross-sectional profile and thereby may extend from the substantially consistent profile provided.

As shown, in preparing the LED lighting assembly 200, the LED lighting device 100 may be provided with the front panel 210, which may function as a stabilizing panel comprising a first material. The front panel 210 is typically sized and shaped in concert with the frame 110, such that the front panel substantially corresponds to the size and shape of the inner surface 230 of the frame 110. Accordingly, where the frame 110 is in the shape of an R, as shown in FIG. 3, the front panel 210 would similarly be in the shape of an R and would be sized to abut the inner surface 230 of the frame on all sides when inserted into the frame.

The front panel 210 of the LED lighting assembly 200 would typically be formed from a mechanically rigid and robust material, such as a polycarbonate panel. In some embodiments, the front panel 210 is transparent, or substantially transparent, in order to avoid impacting the quality of light being output from the front of the LED lighting device 100. In some embodiments, the front panel 210 is opaque or translucent white.

The front protrusion 250 is set back from a front edge 260 of the frame 110, and the front panel 210 is typically mechanically fastened to the front protrusion 250 at a plurality of locations adjacent the inner surface 230 of the frame. The mechanical fastening may be by way of, for example, nails 270 or screws fixing the front panel 210 to the front protrusion 250 at various locations along an outer boundary of the front panel. Additionally, or instead of such nails 270 or screws, the front panel 210 may be fixed to the front protrusion 250 by adhesive.

Further, while a front protrusion 250 is shown, some embodiments may not include such a protrusion, and may instead directly fix the front panel 210 to the inner surface 230 of the frame 110. Similarly, the entire LED lighting assembly may be assembled as a single unit.

In the embodiment shown, the front protrusion 250 is typically set back from the front edge 260 by a depth 280 greater than a thickness 290 of the front panel 210. Accordingly, the front panel 210 is typically fully within the frame 110 and is itself set back from the front edge 260, such that the front lip 220 extends from a front 300 of the front panel 210 to the front edge 260.

Accordingly, the front panel 210 is fixed to the frame 110 adjacent a front of the frame, such that the front 300 of the front panel 210 combines with the interior surface 230 of the frame at the front lip 220 to define an enclosed tray 310.

During use, the LED lighting device 100 is further provided with at least one LED lighting module behind the front panel 210 and directed towards the front panel. Such an LED lighting module is typically mounted on a backer panel, and the LED lighting modules are located within the lighting chamber 240 of the frame 110 and face the front panel 160. As such, any light exiting the LED lighting module is directed towards and passes through the front panel 210. As shown, the LED lighting assembly 200 may be further provided with a back protrusion 320 extending from the inner surface 230 and set back from a back edge 330 of the frame 110 in order to support such a backer panel.

Figure 5:
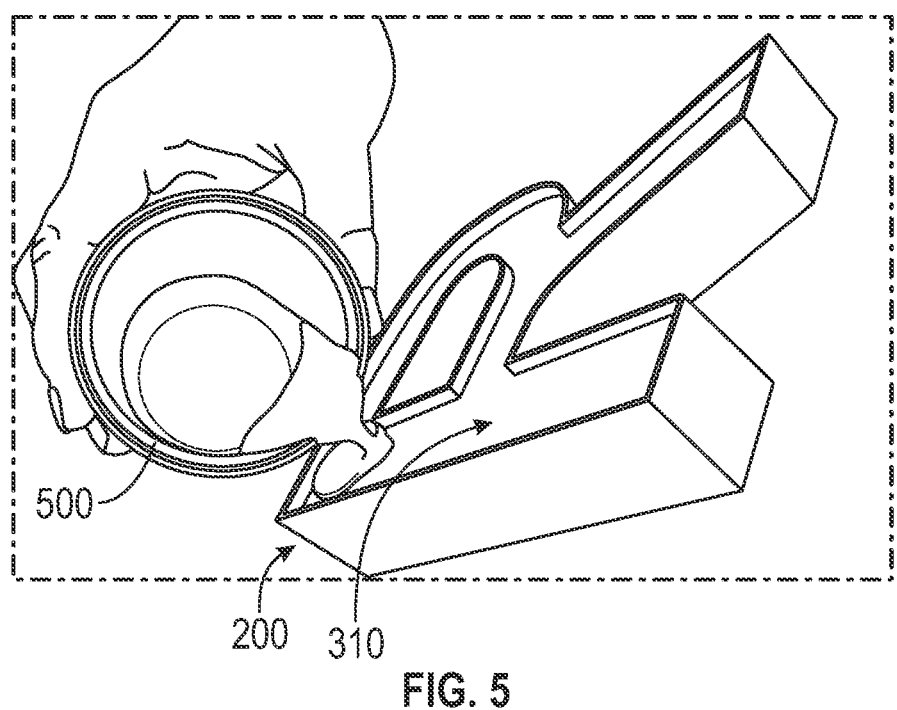
FIG. 5 shows an existing method for assembling an LED lighting device.

FIG. 5 shows an existing method for assembling an LED lighting device 100 from an LED lighting assembly 200. As shown, a person might fill a cup 500 or other container with a compound 510, such as polyurethane in a liquid or resin form, and mix it with any additives intended for inclusion. The person might then pour the polyurethane-based compound 510 into an enclosed tray 310, such as that in the LED lighting assembly 200 described above. The compound 510 is then allowed to cure in the tray 310. Typically, the compound 510 is mixed in the container just prior to pouring, since the combined compound has a short shelf life.

Figure 6:
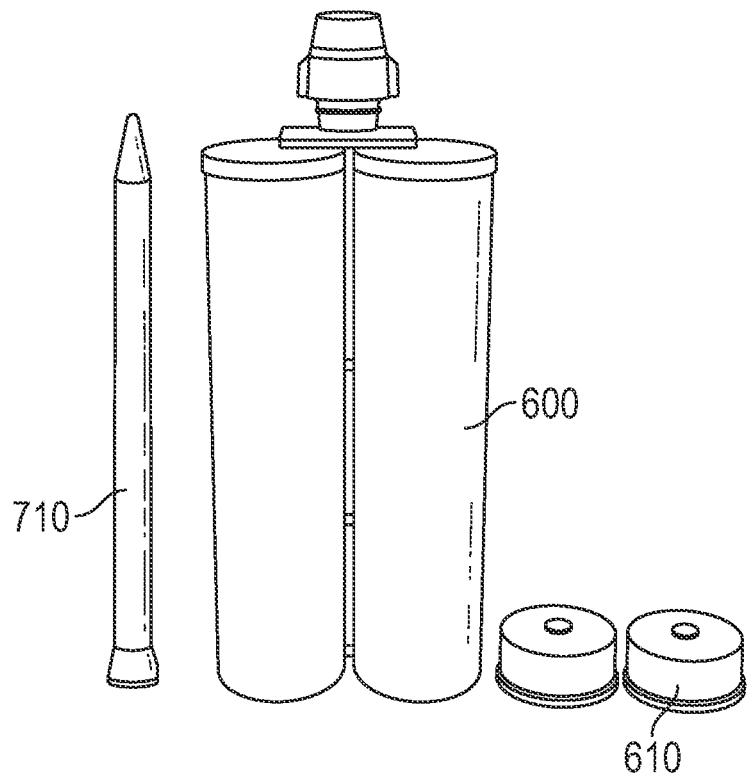
FIG. 6 shows a cartridge for use in the method described herein.
Figure 7:
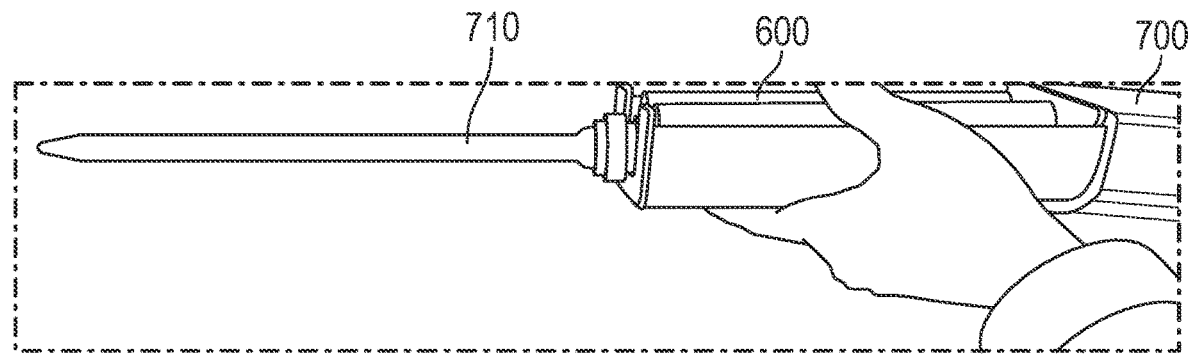
FIGS. 7-10 illustrate a method for assembling an LED lighting device in accordance with this disclosure.

FIG. 6 shows a cartridge 600 for use in the method described herein. When assembling the LED device 100 discussed herein, a user would first provide or be provided with a polyurethane compound, typically in liquid or resin form. The user would then mix a diffuser compound with the polyurethane compound to form a combined compound.

The diffuser compound modifies certain characteristics of the polyurethane compound or resin. In some embodiments, the diffusor compound modifies a translucency of the combined compound, such that the diffuser compound is an additive that determines how much light passes through and to what extent that light is diffused.

The diffuser compound may further modify a color of the combined compound, and it may modify a fire-retarding property or surface texture of the combined compound once dispensed into the enclosed tray and cured. The diffuser compound may further modify a viscosity of the compound during dispensing, and may thereby be used to thicken the combined compound a desired amount.

The combined compound is then injected into the cartridge 600. This may be, for example, by way of a filling machine. The cartridge 600 is then closed, such as using a cap 610, and a vacuum is applied to the cartridge. The cartridge is then sealed at a first pressure lower than an ambient pressure. The first pressure may be, for example, a vacuum, or it may be a near vacuum. The use of a vacuum in the cartridge may minimize or eliminate bubbling that otherwise might be introduced during mixing of components. Further contact with ambient air is minimized to allow for longer shelf life.

Once sealed in the cartridge, the combined compound is typically shelf stable. Accordingly, it may be stored while minimizing exposure to air, humidity, and light, thereby extending the shelf-life of the compound in liquid form. Shelf-stable storage in this way may allow for easy distribution to and use by third parties or for finalizing lighting products on site for similar signage systems.

FIGS. 7-10 illustrate a method for assembling an LED lighting device 100 in accordance with this disclosure.

Once the combined compound is in the cartridge 600, an LED lighting assembly 200, such as that discussed above in reference to FIGS. 2-4, is provided. The assembly has a front panel 210 and a frame 110, and the frame extends past the front panel 210 once assembled in order to form an enclosed tray 310 in the shape of the front panel.

The combined compound 800 is then dispensed from the cartridge 600 into the enclosed tray 310. This may be done using a dispensing device 700, which may be hand operable or automated. A dispensing tip 710 may further be applied to the cartridge 600 so that the compound may be directed as needed within the enclosed tray 310. Further, because the dispensing tip 710 can locate the compound directly within the tray 310, exposure to air during application of the combined compound 800 is minimized.

Figure 8:
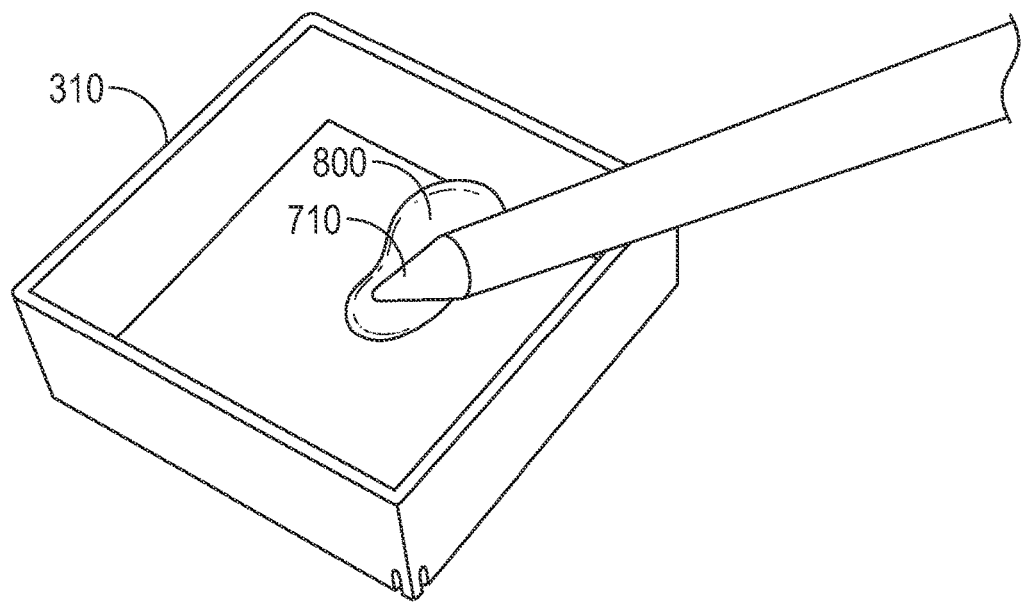
Figure 9:
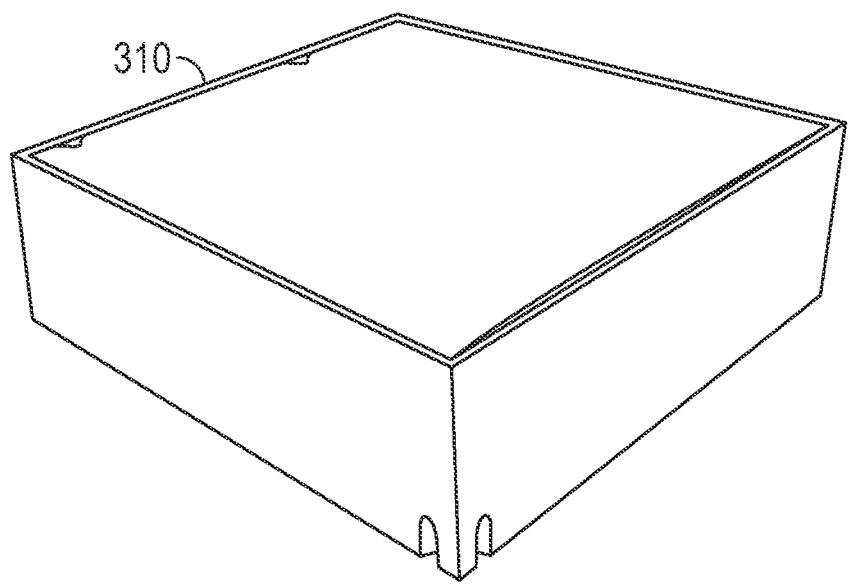
Figure 10:
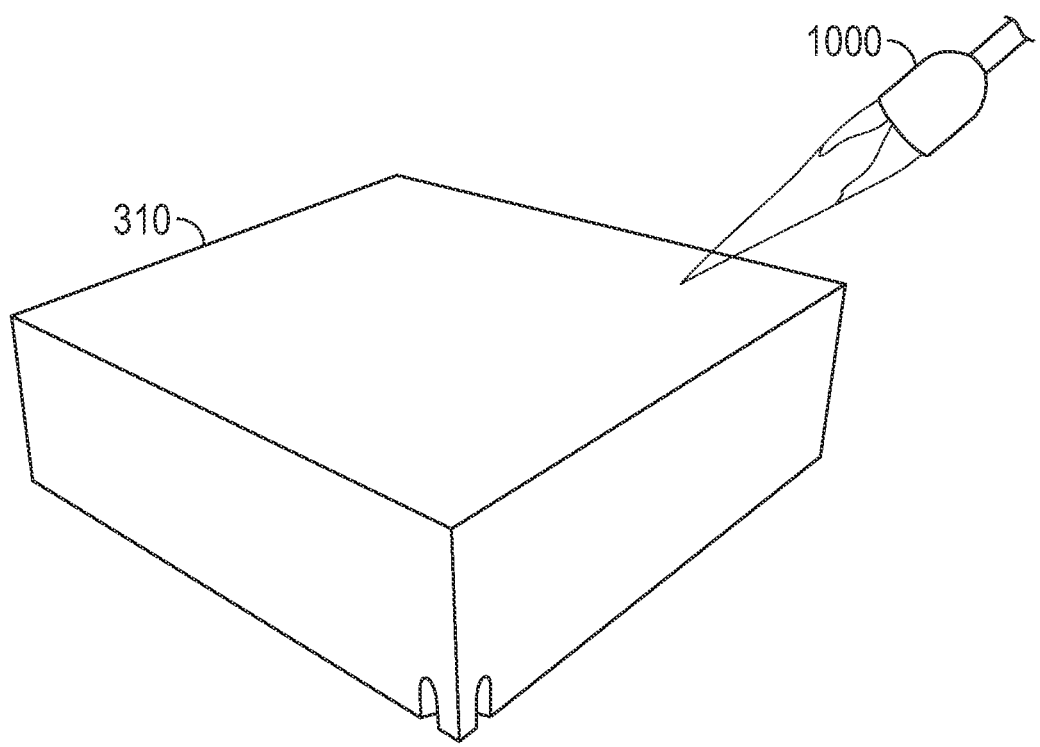

As shown, in FIGS. 8 and 9, the enclosed tray 310 is first filed with the combined compound 800 until all gaps are filled. The combined compound 800 remains in liquid or resin form until the enclosed tray 310 is completely filled, and is then cured. Such curing may be by baking the combined compound 800 in the tray, by leaving exposed for an extended period of time, or by applying heat, such as with a torch 1000 as shown in FIG. 10.

In some embodiments, the front panel 210 is transparent, such that the combined compound provides any color, texture, and translucency to be applied to the LED lighting device 100.

After completing the application of the combined compound to an LED lighting device 100, or a portion of an LED lighting device, the cartridge 600 may be resealed, such that any remaining portion of the compound can be saved. In some embodiments, a vacuum may be reapplied, if necessary, in order to preserve the stability of the compound in storage. The combined compound may then be used further by applying a new dispensing tip 710.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for assembling an LED lighting device comprising:
   providing a polyurethane compound;
   mixing a diffuser compound with the polyurethane compound to form a combined compound;
   injecting the combined compound into a cartridge;
   applying a vacuum to the cartridge;
   sealing the cartridge at a first pressure lower than ambient pressure;
   providing an LED lighting assembly having a front panel and a frame, the frame extending past the front panel to form an enclosed tray in a shape of the front panel; and
   dispensing the combined compound from the cartridge into the enclosed tray,
   wherein the polyurethane compound and the combined compound are in liquid form until dispensed from the cartridge, and wherein the combined compound cures to a solid in the enclosed tray.

2. The method of claim 1 wherein the diffusor compound modifies a translucency of the combined compound.

3. The method of claim 1 wherein the diffusor compound modifies a color of the combined compound.

4. The method of claim 1 wherein the diffusor compound modifies a fire-retarding property or surface texture of the combined compound once dispensed into the enclosed tray and cured.

5. The method of claim 1 wherein the diffusor compound modifies a viscosity of the compound during dispensing into the enclosed tray.

6. The method of claim 1 wherein the shape of the front panel is a shape of a letter.

7. The method of claim 1 wherein the first pressure is a vacuum.

8. The method of claim 1 wherein the front panel of the LED lighting assembly is transparent.

9. The method of claim 8 wherein the front panel is formed from polycarbonate.

10. The method of claim 9 wherein the frame is formed from a flexible metal, and wherein, prior to providing the LED lighting assembly, the frame is secured in the shape of the front panel by fixing the front panel to an interior surface of the frame.

11. The method of claim 1 wherein the frame has a substantially consistent cross-sectional profile matching the shape, and wherein the front panel is fixed to the frame adjacent a front of the frame such that a front of the front panel combines with an interior surface of the frame to define the enclosed tray.

12. The method of claim 11 wherein the frame houses at least one LED lighting module behind the front panel and directed towards the front panel.

13. The method of claim 1 further comprising curing the combined compound by applying heat after dispensing into the enclosed tray.

* * * * *